United States Patent [19]

Miranda

[11] 3,886,067

[45] May 27, 1975

[54] PROCESS FOR CONTROLLING OIL SLICKS
[76] Inventor: Salvatore W. Miranda, P. O. Box 5746, Carmel, Calif. 93921
[22] Filed: Feb. 3, 1970
[21] Appl. No.: 8,198

[52] U.S. Cl. ............ 210/40; 210/242; 210/DIG. 21
[51] Int. Cl. ......................... C02b 9/02; E02b 15/04
[58] Field of Search............... 210/40, 242, DIG. 21; 260/2.5; 264/46, 321

[56] References Cited
UNITED STATES PATENTS

| 2,984,631 | 5/1961 | Talalay et al. | 260/2.5 |
|---|---|---|---|
| 3,334,042 | 8/1967 | Teitsma | 210/40 X |
| 3,377,297 | 4/1968 | Hanlin | 260/2.5 |
| 3,391,093 | 7/1968 | Frost | 260/2.5 |
| 3,452,127 | 6/1969 | Lovette et al. | 264/321 X |
| 3,518,183 | 6/1970 | Evans | 210/40 |
| 3,532,622 | 10/1970 | McNeely | 210/242 X |
| 3,598,729 | 8/1971 | Baumann | 210/40 |
| R24,514 | 8/1958 | Hoppe et al. | 260/2.5 |

OTHER PUBLICATIONS

Chemical and Engineering News, July 1, 1968, p. 46.

Primary Examiner—Thomas G. Wyse
Attorney, Agent, or Firm—Edward A. Sokolski

[57] ABSTRACT

Oil slicks on surface waters are controlled by applying oleophilic foam material to the slick from a boat or airplane. In one case the material foams and binds the oil to form sponge-like clods which can be skimmed from the surface by another ship. In another embodiment chips of the film material which are formed on board the craft are applied to the oil slick.

15 Claims, 4 Drawing Figures

PATENTED MAY 27 1975　　　　　　　　　　　3,886,067

SHEET 1

INVENTOR
SALVATORE W. MIRANDA
BY
　Lindenberg & Freilich
ATTORNEYS

PROCESS FOR CONTROLLING OIL SLICKS

BACKGROUND OF THE INVENTION

1. Field of the Invention

The present invention relates to the control, and removal of oil pollution from surface waters and more particularly the invention relates to materials and equipment for clean-up and oil slicks on surface waters.

2. Description of the Prior Art

The frequency and danger of oil spills has greatly increased in the past several years due to the use of super-tankers and the off-shore drilling in geologically active areas such as the Santa Barbara Channel. Oil spill disasters have been experienced in the last two years due to these activites. The Torrey-Canyon tanker caused a large oil slick which fouled recreactional beaches in Great Britain. An off-shore well in the Santa Barbara Channel developed a fissure on Jan. 28, 1969 causing an oil slick which fouled beaches in Santa Barbara and Ventura Counties. The effect on marine life, birds and the total ecological balance cannot be determined.

The techniques available for controlling and removing the slick from surface waters are unsatisfactory. Dispersants and detergents are effective in eliminating much of the slick but are feared because of the unknown effect on the ecological balance. Various absorbent materials have been proposed to be applied to the slick to sink the oil to the bottom of the ocean. Again, this may drastically upset the ecological balance.

Another technique utilizes a treated silica which will act as a wick and permit burning of the slick. This is not effective in many circumstances and is dangerous, especially in the presence of a natural gas leak. For these reasons, the slicks have been mainly controlled by very primitive methods such as by skimming with pumps and by coagulating the oil with straw which is then removed and burned.

SUMMARY OF THE INVENTION

Oil slicks are controlled according to the invention by applying an oleophilic foam resin to the slick to bind the oil. The oil impregnated foam is removed from the surface by skimming pumps and the remaining sponge-like clods either sink to the bottom or reach beaches in an easily removable form which does not exude oil which could foul the shores line.

In one embodiment, the boat or aircraft contains means for separately spraying liquid streams of reactive resin foaming materials onto the water surface to react with and bind the oil to form particles of foam. In another embodiment of the invention, the boat or aircraft contains a supply of the reactive chemicals which are combined on board the craft to form a body of oleophilic foam. The foam is then fed to a chipper and the chips of foam are applied to the slick. Since the liquid reactants expand to many times their initial volume, the craft can carry a considerably greater supply of sorbent material as compared to the uses of other materials for binding the oil.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
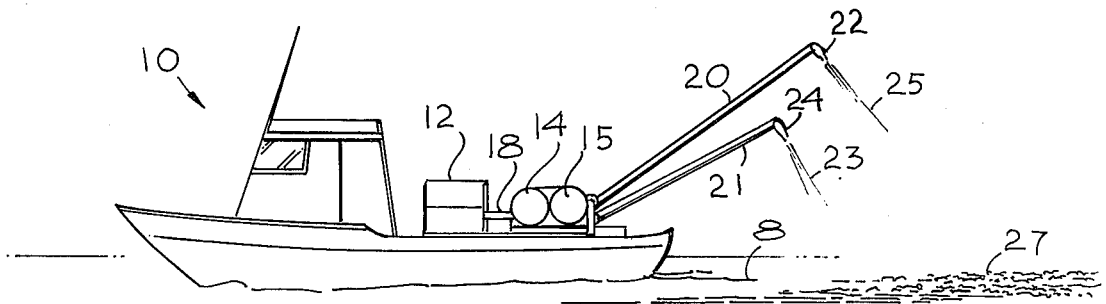
FIG. 1 is a schematic view of a first system in accordance with the invention for controlling oil spills.

Referring now to FIG. 1, a first embodiment of an oil slick control system generally includes a ship 10 on which is mounted equipment for spraying liquid foam forming resin components onto an oil slick 8. The equipment includes a compressor 12 which applies spraying pressure to barrels 14, 15 through hoses 18.

Output hoses 20, 21 deliver separate streams 23, 25 of liquid through nozzles 22, 24 onto the oil slick 8. The streams 23, 25 combine with the oil slick 8 and foam to form particles of foam 27. The particles are skimmed from the surface by another ship, not shown, containing a skimming pump having an inlet hose immersed in the oil slick 8. The liquid components may be sprayed from separate ships or from one or more airplanes or helicopters. Aircraft can apply the liquid in a shorter perioc but cannot carry as large a reservoir as a ship. The choice of craft for carrying the spray equipment will depend on the extent of the slick and the facilities available for fueling and reloading the liquid.

Figure 2:
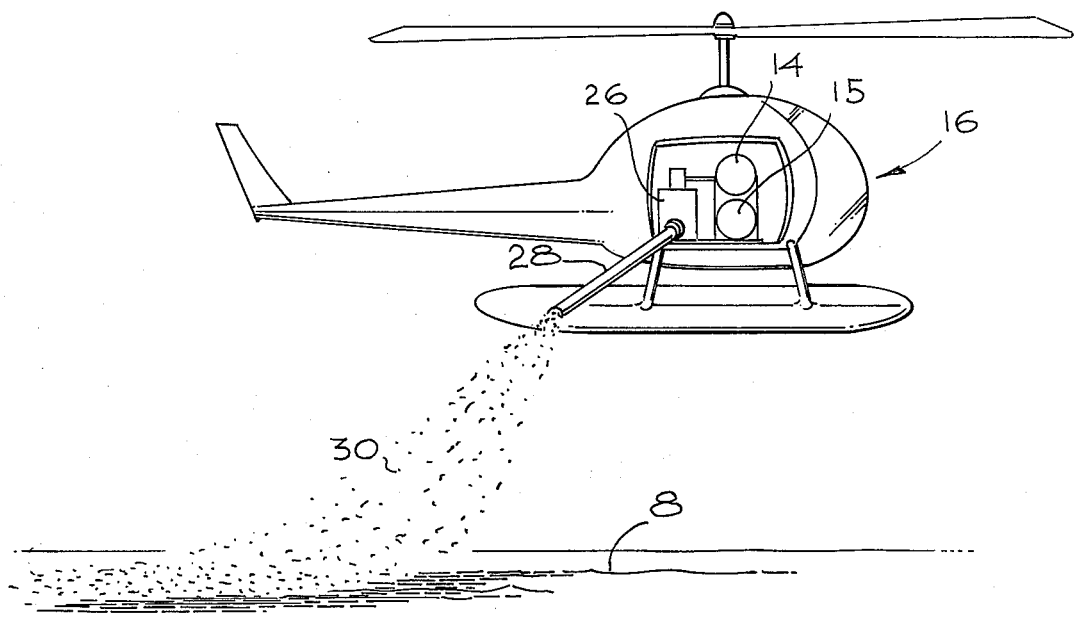
FIG. 2 is a schematic view of another system for controlling oil spills in accordance with the invention.

Another system is illustrated in FIG. 2. A helicopter 16 applies chips 30 of an oleophilic foam to the oil slick 8. The chips are produced aboard the helicopter from barrels 14, 15 containing the liquid reactants which are delivered to a device 26 in which the liquids react to form a foam which is chipped before delivery to outlet chute 28. Again this equipment may be carried by a boat or other craft which can transverse the oil spill and dispense the material.

The foamable liquid in accordance with the invention can comprise many different components which react to form an oleophilic foam material. The reactants in this spray process are preferably compatible with oil and can react with up to 75 percent by weight of oil. The foamable liquids in accordance with the invention preferably comprise a pre-formulated polymerizing system adapted to compensate for properties of a wide variety of oils. This system essentially includes a polymerizing agent component and a resin component. These two components when mixed, react at ambient temperature to form solid foam products. Suitable fillers such as carbon black or other particulate material may be present.

The composition of the invention is compatible with a wide variety of petroleum products either light or heavy viscosity and of aliphatic, aromatic, or nathenic character, such as fuel oil, parraffin oil, mineral oil, jetfuel, diesel fuel including marine, truck, and railroad diesels, heating fuels, and crude oils. The composition may also be utilized to bind oils of vegetable origin such as linseed oil, cotton seed oil, or the like. The actual characteristics of the oils need not be known since the proportions of the two components can be variod to a ratio providing the desired properties. The order and the manner of mixing is not that influential but is preferable to apply the polymerizing agent to the oil spill first if the resin component is reactive with water.

In a first embodiment of the invention the preformulated polymerizing agent contains polyol, a combination of surfactants and optionally a foam control agent such as a silicone. The polyol can be provided by a mixture of materials at least a portion being formed of a nitrogen containing polyol, for example, a hydroxyalkyl substituted poly-tertiary amine such as those of the formulae:

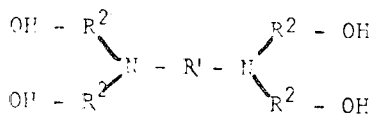

where R' and R² are aliphatic, preferably lower alkyl.

Tertiary amines of this nature are disclosed in U.s. Pat. No. 2,697,118. A suitable commercial hydroxyalkyl poly-tertiary amine is Quadrol, which is N,N,N', N'-tetrakis-(2-hydroxypopyl)-ethylene diamine. It is a viscous liquid having four hydroxy groups assuring a high cross-linked density in the final product. It is also believed to function as a catalyst for the resin cross-linking reaction.

The preformulated polymerizing agent generally contain 30 to 80% nitrogen containing polyol and preferably 45 to 70% of this ingredient. The agent further includes 0 to 5% of a silicone oil, up to 15% of a mixture of surfactants and 10 to 30% of further polyols.

Suitable polyol-terminated polyesters having hydroxyl numbers between 15 and 1,500 and preferably from 200 to 1,000 and a molecular weight of 500 to 10,000 are obtained by an esterification condensation reaction between a dibasic carboxylic acid such as adipic acid, fumaric acid, sebacic acid, and phthalic acid, with a polyhydric alcohol such as ethylene glycol, diethylene glycol, popylene glycol, trimethylol propane, glycerol and the like in such proportion that the resultant product possesses terminal reactive hydroxyl and/or carboxyl groups. Suitable polyesters also include the class of fatty acid glycerides having a hydroxyl number of at least about 50 such as castor oils, hydrogenated castor oils, blown soya bean oils, etc. Polyethers include the polyalkylene glycols such as polyethylene glycol, polypropylene glycol having a molecular weight of at least 200.

A preferable glyceride based polyol is a castor oil reaction product known as Polycin 61 having an iisocyanate equivalent weight of 241, approximate functionality of 2,8, a hydroxyl number of 231, acid value of 2, an estimated molecular weight of 675, density of 0.968g/cc at 25°C and a viscosity at 25°C of 800 cp.

The surfactants are preferably a combination of a water soluble surfactant and an oil soluble surfactant. Suitably the surfactants may both be of a non-ionic type. For example, a class of surfactants which are fatty partial esters of sorbitol anhydride are generally insoluble or dispersible in water and are soluble in most organic solvents. A specific example, Span 20, sorbitan monolaurate, is a non-ionic surface active agent having a hydrophilic-lipophilic balance (HLB) of 8.6.

The second surfactant can also be non-ionic, a suitable class of agents being polyoxyethylene derivatives of sorbitan monolaurate such as Tween 21 which is generally soluble or dispersible in water and fairly insoluble in organic liquids. Tween 21 has an HLB value of 13.3.

A very important property of surfactants is the HLB value. This hydrophilic-lipophilic balance is an expression of the relative simultaneous attraction of an emulsifier for water and for oil. It would appear to be determined by the chemical composition and extent of ionization of a given emulsifier. A low HLB value is representative of a strongly lipophilic agent and a very high HLB is evidence of a strongly hydrophilic characteristic of the emulsifier since it ionizes to provide an even stronger hydrophilic tendency. The HLB valve of an emulsifier system determines the type of an emulsion that tends to be formed. It is an indication of behavior characteristics and also an indication of emulsifier efficiency. Thus emulsifier systems having low HLB valves will tend to form water-in-oil emulsions.

The HLB value for most non-ionic emulsifiers is merely an indication of the percentage weight of the hydrophilic portion of the molecule. A non-ionic emulsifier if it were 100% hydrophilic would be assigned on HLB value of 20. It is preferred that the HLB value of the surfactant insoluble or dispersible in water be below 10 and value of the surfactant soluble in water be above 10. These surfactants are utilized in about equal proportions. However, by having the water insoluble surfactant predominate the product may be rendered of more oleophilic character.

The preformulated polymerizing agent can optionally include a foam regulating agent such as a silicone oil typically a polydimethylsiloxane having a viscosity ranging from 1 to 100,000 cs. These fluids are commercially available and a suitable material is DC 201 (DOW CORNING).

The resins may be of many types such as iisocyanate terminated resins, carboxyl terminated resins, amino terminated resins, hydrocarbon resins such as polystyrene or polyethylene and the like. It is preferred to use a polyol reactive resin such as polyiisocyanate. The isocyanate may be of aliphatic or aromatic character. Samples of suitable polyisocyanates are benzene 1,3-diisocyanate, hexane, 1,6-diisocyanate, tolylene 2,4-or 2,6-diisocyanate (TDI), tolylene 2,3-diisocyanate, diphenylmethane 4,4'-diisocyanate, naphthalene 1,5-diisocyanate, diphenyl 3,3'-dimethyl 4,4'diisocyanate, diphenyl 3,3'-dimethoxy 4,4'-diisocyanate, 2,2'-diisocyanate diethyl ether, 3(diethylamino) pentane 1,5-diisocyanate, butane 1,4-diisocyante, cyclohex-4-ene 1,2-diisocyanate, benzene 1,3,4-triisocyanate, naphthalene 1,3,5, 7-tetraisocyanate, naphthalene 1,3,7-triisocyanate, toluidine diisocyanate, isocyanate terminaed prepolymers, polyaryl polysiocyanates, and the like.

A suitable commerical available polyaryl polyisocyanate is known as PAPI-1. This material has an average of 3 iisocyanate groups per molecule and an average molecular weight of about 380. The iisocyanate groups may be rendered non-reactive or blocked or marked by reaction by mono alcohols or amides such as phenols. The isocyanate groups may then be activated by heat. A suitable blocked iisocyanate is Mondur MR, a phenylene blocked diisocyanate.

Each fuel oil requires a different percentage of resin. For example, for each pound of oil the amount of resin required is listed in the following table:

TABLE I

| Oil Type | Resin, lbs. |
| --- | --- |
| Jet fuels | 0.10 |
| Diesel fuels (marine, railroad, truck) | 0.15 |
| Heating fuels (No. 4 and Black No. 5) | 0.20 |
| Bunker fuels, light and heavy No. 6 oils | 0.25 |

A first type of product formulated from 30 to 80% of a tertiary amino alkano, 10 to 30% of a polyol and below 15% of an equal proportion of a mixture of surfactants when reacted with 20 to 70% oil and about an equal amount of resin forms hard and brittle products. A typical example follows:

EXAMPLE I

Seventy parts by weight of N,N,N', N'-tetrakis-(2-hydroxypropyl) ethylene diamine was mixed with 20 parts of a castor oil polyol (Polycin 61), 8 parts of an equal mixture of Span 20 and Tween 21 non-ionic surfactants and 5 parts of a polydimethyl siloxane (GE1079) to form a polymerizing agent. Ten parts of the agent are vigorously mixed with 100 parts of toluene diisocyanate which is then added to 90 parts of fuel oil. A hard and brittle product is obtained.

EXAMPLE II

A 4 pound density was produced by adding 15 parts of Freon-11B (trichlorofluoromethane) to the polymerizing agent.

EXAMPLE III

Another typical foaming agent may include the following ingredients in parts by weight:

| Ingredient | Range | Preferred |
| --- | --- | --- |
| (1) Polydimethyl siloxane | 60–90 | 80 |
| (2) Water (reacts with excess isocyante to evolve $CO_2$) | 10–30 | 19 |
| (3) A surfactant such as ethoxylated castor oil (Alpco Chemical Co., No. 365) | Oil to 2 | 0.5 |
| (4) An emulsification agent for silicone oil and water to prevent separation (Witco Chemical Co. No. 1058) | Oil to 2 | 0.5 |

Three pounds of the foaming agent added to 60 pounds of binder oil, 40 pounds of formulated polymerizing agent and 63 pounds of TDI gives a light density-semi-rigid foam.

EXAMPLE IV

As a further typical formulation a polymerizing agent was prepared containing the following ingredients:

| Ingredients | PBW |
| --- | --- |
| Tertiary amine polyol (Quadrol) | 50 |
| Polymerized Castor oil polyol (Polycin 61) | 40 |
| Water soluble non-ionic surfactant (Tween 21) | 4 |
| Oil soluble non-ionic surfactant (Span 20) | 4 |
| Silicon oil (GE 1079) | 2 |

One part of foaming agent was added to 50 parts of the polymerizing agent and then mixed with 100 parts of mineral oil. Onehundres (100) parts of polyisocyanate resin was then added to form a semi-rigid closed cell light density foamed product.

EXAMPLE V

Example IV was repeated utilizing 50 parts of a formulated polymerizing agent containing 70 parts of LA 700, a polyether polyol having a hydroxyl number of 700 and a molecular weight of about 400, 20 parts of the castor oil polyol, 4 parts Tween 21, 4 parts Span 20 and a small amount of tin octoate. A similar product resulted.

Figure 3:
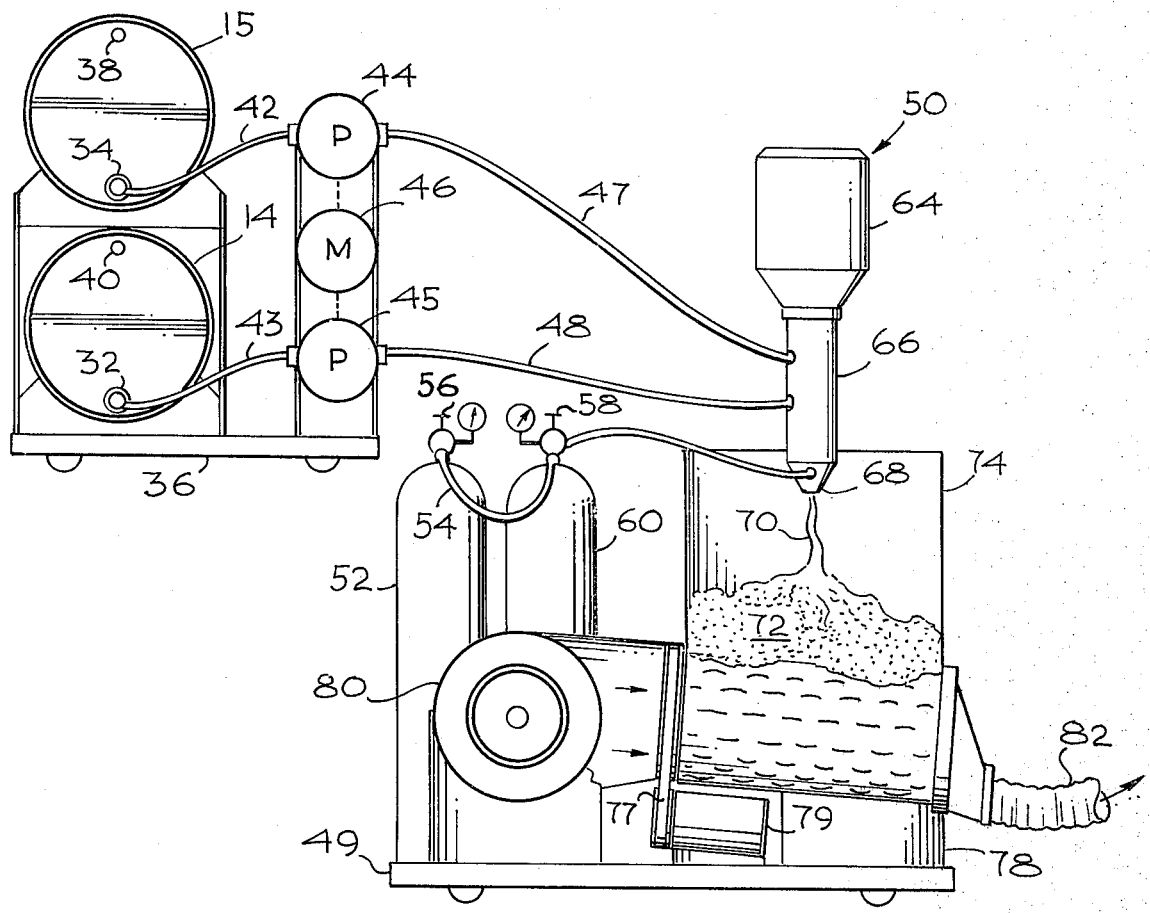
FIG. 3 is a perspective view of a first portable apparatus for preforming chips of oleophilic foam on board a craft.
Figure 4:
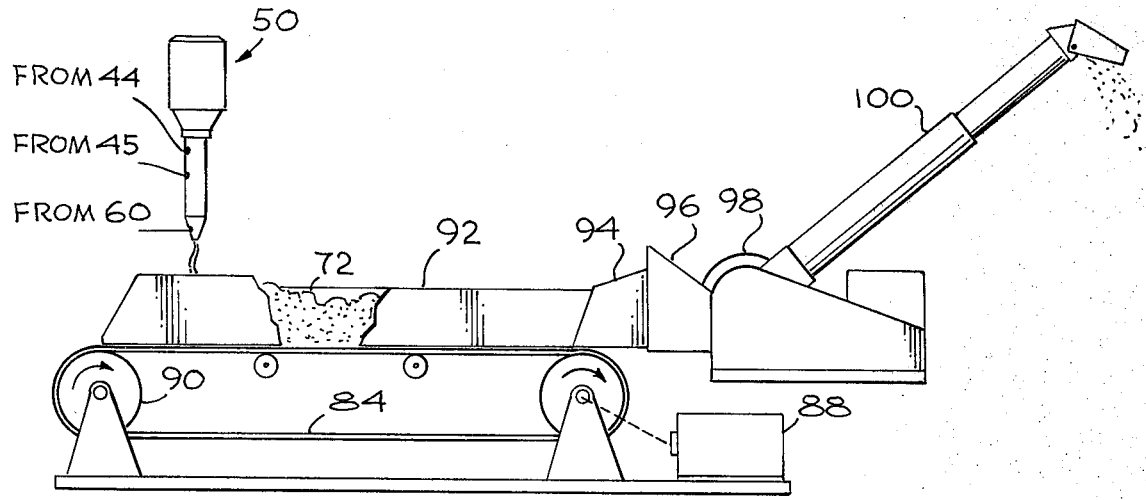
FIG. 4 is a perspective view of a further apparatus for forming chips of oleophilic foam on board a craft.

The rigid foam products can be chipped in the apparatus described in FIGS. 3 or 4. Referring now to FIG. 3 a portable apparatus suitable for foaming and chipping the rigid foam described above is illustrated. The self-contained portable units can be quickly delivered to an emergency spill area and immediately put into operation to remove the oil from the surface waters. The portable equipment is carried on dollies 32 and 49.

A pair of barrels 14, 15 and pumps 44, 45 are installed on dolly 32. The barrels 14, 15 contain the liquid polymerizing agent and resin components, respectively. Each barrel contains a delivery hose 42, 43 communicating with inlet to pumps 44 and 45. The hoses are joined to the barrels by quick couplings 34, 36 installed in each barrel. Each barrel further preferably contains a stop clock vent 38, 40. The pumps are preferably positive displacement pumps driven by a common variable drive motor 46.

The dolly 49 contains a combined unit for foaming and chipping the foam. The unit generally includes a static mixer 50 disposed over a foam hopper 74, a drum grater 76 and various means for feeding the liquids to the mixer 50 and for dispensing the chips from the grater 76.

The output from pumps, 44, 45 is delivered to mixer 50 through hoses 47, 48. A separate supply of a liquid foaming agent such as Freon 12 ($CCl_2F_2$) is fed to the head by means of tanks 52 and 60 containing nitrogen and Freon 12 respectively. The nitrogen tank 52 contains a regulating valve head 56 connected to the regulating valve head 58 of the Freon tank 60 by means of hose 54. The nitrogen gas propels the Freon 12 into mixer 50 through hose 62.

An explosion proof motor 64 drives the mixing head 66. The three streams are ultimately mixed within mixing head 66 and leave the outlet 68 in the head as a foamed mixture 70 which falls into hopper 74. Within a short period the mixture sets and cures into a rigid foam 72 which is continuously fed downwardly toward drum grater 76.

The drum grater 76 is disposed in the bottom of hopper 74 and rests on arcuate rotatable support 78. The drum is driven by belt 77 and motor 79. As the drum grater rotates, the bottom surface of the body of rigid foam 72 is cut into chips 27 which enter the center of the drum 76 and the foam 72 progressively falls down the hopper 74. A fan 80 is positioned at one end of the drum 76 and expels the chips 27 into a flexible hose 82 which has one end connected to an aperture in the wall of hopper 74 opposite the other end of the drum. The chips 27 are dispensed from the outlet end of hose 82 onto the oil slick 8.

In a further embodiment of the invention illustrated in FIG. 4 the mixer 50 is positioned over the rear end of a conveyor belt 84. The sides of the belt are partially enclosed by vertical guides 92 suitably formed of a smooth, release material such as Teflon, a polytetrafluoroethylene.

The conveyor belt 84 is supported between a forward drive wheel 86 and a rear idler wheel 90. The forward drive wheel is driven by motor 88. The foamable composition 70 falls onto the belt 84 and expands. The expansion is limited horizontally by the guides 92 and a substantially rectangular body of foam 72 progresses down the belt. The foam 72 leaves the belt and crosses transfer table 94 which delivers the foam to the mouth 96 of a brush chipper 98.

The chips of foam leave the chipper through an adjustable height, telescoping chute 100.

The chips of foam are preferably from 1/16 to 1/8 inch in thickness and have a density from 2 to 6 lbs./cubic foot. On a weight basis these chips absorb 10 to 13 times their weight in oil and on a volume basis 1 cubic foot of foam will absorb 3 to 4 gallons of oil. The foam material according to the invention absorb more of heavier, more viscous liquids such as crude oil as compared to lighter oil such as transformer oil.

It is to be realized that only preferred embodiments of the invention have been described and that numerous substitutions, alterations and modifications are all permissible without departing from the spirit or scope of the invention as defined in the following claims.

What is claimed is:

1. A method of coagulating oil slicks on water comprising the steps of:
    applying to the slick an oleophilic organic resin semi-rigid to rigid foam containing a mixture of water soluble and oil soluble surfactants;
    binding the oil on the foam; and
    removing the foam from the surface of the water.

2. A method according to claim 1 in which the foam is in the form of pre-foamed thin chips.

3. A method according to claim 2 in which the chips have a thickness of 1/16 to 1/8 inch.

4. A method according to claim 2 in which reactive resin forming liquids are reacted on a craft above the water to form the foam which is then cut into chips and applied to the oil slick.

5. A method according to claim 1 in which foam forming resin component liquids are sprayed onto the oil slick and the liquids react and bind the oil into foam particles.

6. A method according to claim 1 in which the foam is formed from a polyol and a polyol reactive resin.

7. A method according to claim 6 further including 10–25% by weight of a foaming agent and said resin is a polyisocyanate.

8. A method according to claim 7 in which the foaming agent is a flourinated hydrocarbon liquid.

9. A system for controlling an oil slick on the surface of water comprising:
    a craft for traversing the slick;
    supply means containing a reservoir of oleophilic semi-rigid to rigid foam resin containing a mixture of water soluble and oil soluble surfactants mounted on said craft; and
    dispensing means mounted on said craft for applying the foam resin to the slick.

10. A system according to claim 9 wherein said supply means contains liquid components reactive to form an oleophilic foam.

11. A system according to claim 10 in which said dispensing means contains means for separately applying the liquid components to the oil slick to react and bind said oil.

12. A system according to claim 10 in which said supply means further contains mixing means for mixing said components, foaming means receiving said mixed components for forming a solid foam of said components and atrrition means for forming chips of said solid foam.

13. A system according to claim 12 in which said foaming means comprises a receptacle positioned under said mixing means and said attrition means is disposed in the lower portion of said receptacle.

14. A system according to claim 13 in which said attrition means comprising a hollow rotatable drum containing slots for chipping said solid foam whereby the chips enter the inside of said drum and said dispensing means comprise a source of gas disposed at one end of the drum and an outlet chute disposed at the opposite end of the drum.

15. A system according to claim 12 which said foaming means comprise a conveyor belt, means for moving said conveyor belt and vertical guide members disposed on each side of the conveyor belt.

* * * * *